United States Patent [19]

Wilson et al.

[11] Patent Number: 4,856,484
[45] Date of Patent: Aug. 15, 1989

[54] LIQUIFIED PETROLEUM GAS FUELLED TWO STROKE ENGINE

[76] Inventors: Robert S. Wilson, 8 Clyde Street, Ferntree Gully, 3156, Victoria; William M. Lynch, 4 Kirrawee Avenue, Wantirna South, 3152, Victoria, both of Australia

[21] Appl. No.: 68,614

[22] Filed: Jun. 30, 1987

[51] Int. Cl.[4] .......................................... F02M 21/02
[52] U.S. Cl. ................................. 134/525; 123/73 AD
[58] Field of Search ................. 123/257, 73 A, 527, 123/575, 27 GE, 73 AD

[56] References Cited

U.S. PATENT DOCUMENTS

| | | | |
|---|---|---|---|
| 2,758,576 | 8/1956 | Schlamann | 123/257 |
| 2,914,041 | 11/1959 | Froehlich | 123/257 |
| 3,425,399 | 2/1966 | Ward et al. | 123/257 |
| 4,091,772 | 5/1978 | Heater et al. | 123/257 |
| 4,098,248 | 7/1978 | Todd | 123/527 |
| 4,121,631 | 10/1978 | Jones | 123/73 AD |
| 4,317,432 | 3/1982 | Noguchi et al. | 123/1 R |
| 4,677,944 | 7/1987 | Nishimura et al. | 123/575 |
| 4,726,330 | 2/1980 | Shiga | 123/73 AD |

*Primary Examiner*—E. Rollins Cross
*Attorney, Agent, or Firm*—Scully, Scott, Murphy & Presser

[57] ABSTRACT

A two-stroke internal combustion engine is fuelled by liquified or compressed natural gas. Lubricating oil, in a solution with liquid petroleum, is atomized in a fuel gas/air stream before entering a combustion chamber.

5 Claims, 1 Drawing Sheet

LIQUIFIED PETROLEUM GAS FUELLED TWO STROKE ENGINE

BACKGROUND OF THE INVENTION

1. Field of the Invention

This invention relates to two stroke internal combustion engines and in particular to such engines fuelled by liquified or compressed fuel gas.

2. Description of the Prior Art

Two stroke or two cycle engines are well known and conventionally use liquid petroleum as a fuel and the moving components in the crankcase are lubricated by oil. Most commonly the oil is premixed with the liquid fuel at a typical ratio of 1 to 50 by weight and is introduced into the combustion chamber via a carburettor. Liquified fuel gas usually comprises propane, butane and other gaseous hydrocarbons and is well known as a fuel for heating and lighting as well as for internal combustion engines. In this specification the term liquified fuel gas refers to combustible gases that are in the gaseous state at ambient temperature and atmosphere pressure, but which under pressure are normally stored in the liquid state. Their source is usually from naturally occurring gas or oil fields. The term fuel gas also includes combustible gases synthetically made or made from the degradation of waste matter. The term also includes generally combustible gases, including hydrogen. In this specification the term compressed fuel gas refers to combustible gases stored under greater than atmospheric pressure. Despite its widespread availability and lower retail price, liquified or compressed fuel gas has hitherto been confined to four stroke internal combustion engines. Previously it has not been found that liquified fuel gas can be satisfactorily used as a fuel for two stroke engines.

SUMMARY OF THE INVENTION

It is an object of this invention to provide an improved two stroke engine. This invention provides in its broadest form a two stroke internal combustion engine fuelled by liquified or compressed fuel gas. In a further form, the invention provides a two stroke internal combustion engine fuelled by liquified or compressed fuel gas including means for direct oil injection of lubricating oil into the crankcase whereby moving parts in the crank case are lubricated. Known techniques of direct oil lubrication of conventional two stroke engines are applicable to the present invention. In a preferred form means are provided such that lubricating oil is introduced into the engine by first diluting the lubricating oil with a combustible thinning solvent, then atomizing the solution in an air petroleum gas stream and then introducing the atomized solution, air and fuel gas into a combustion chamber of the engine.

More preferably the solution is introduced into a bowl of a carburettor and atomization takes place by the solution being drawn through a main jet by the passage of air and fuel gas.

In a still further preferred form the combustible thinning solvent is liquid petroleum and the preferred ratios of oil to liquid petroleum is from approximately 1 to 4 to 1 to 20 by weight.

In a preferred embodiment the two stroke engine further comprises a warning means adapted to indicate when the lubricating oil is not being introduced into the engine.

Preferably, the two stroke engine further comprises means adapted to cool the engine with water, and more preferably the means is adapted to introduce cooling water to a housing located about the exhaust manifold.

The compositions of the lubricating oil and liquified or compressed fuel gas are not critical for the working of the invention. Acceptable oils are those suitable for conventional liquid petroleum fuelled two stroke engines and acceptable gases are those suitable for four stroke engines. The nature of the combustible thinning solvent is also non critical, its main function being to reduce the viscosity of the oil to allow transport and atomization of the solution of the oil in the solvent. It is preferred, however, that the thinning solvent is volatile such that when it enters the combustion chamber it is gasefied and may be combusted in admixture with air and the fuel gas. Known methods exist for adapting liquified or compressed fuel gas fuel to be mixed with air at the appropriate ratio prior to entering the combustion chamber of the engine.

This invention also provides a method of operating a two stroke engine comprising the steps of reducing the viscosity of a lubricating oil by dissolution with a combustible thinning solvent, atomizing this solution into a stream of liquified or compressed fuel gas and air and introducing the fuel gas, air and atomized solution into the combustion chamber of the engine.

DETAILED DESCRIPTION OF THE PREFERRED EMBODIMENT

Figure 1:
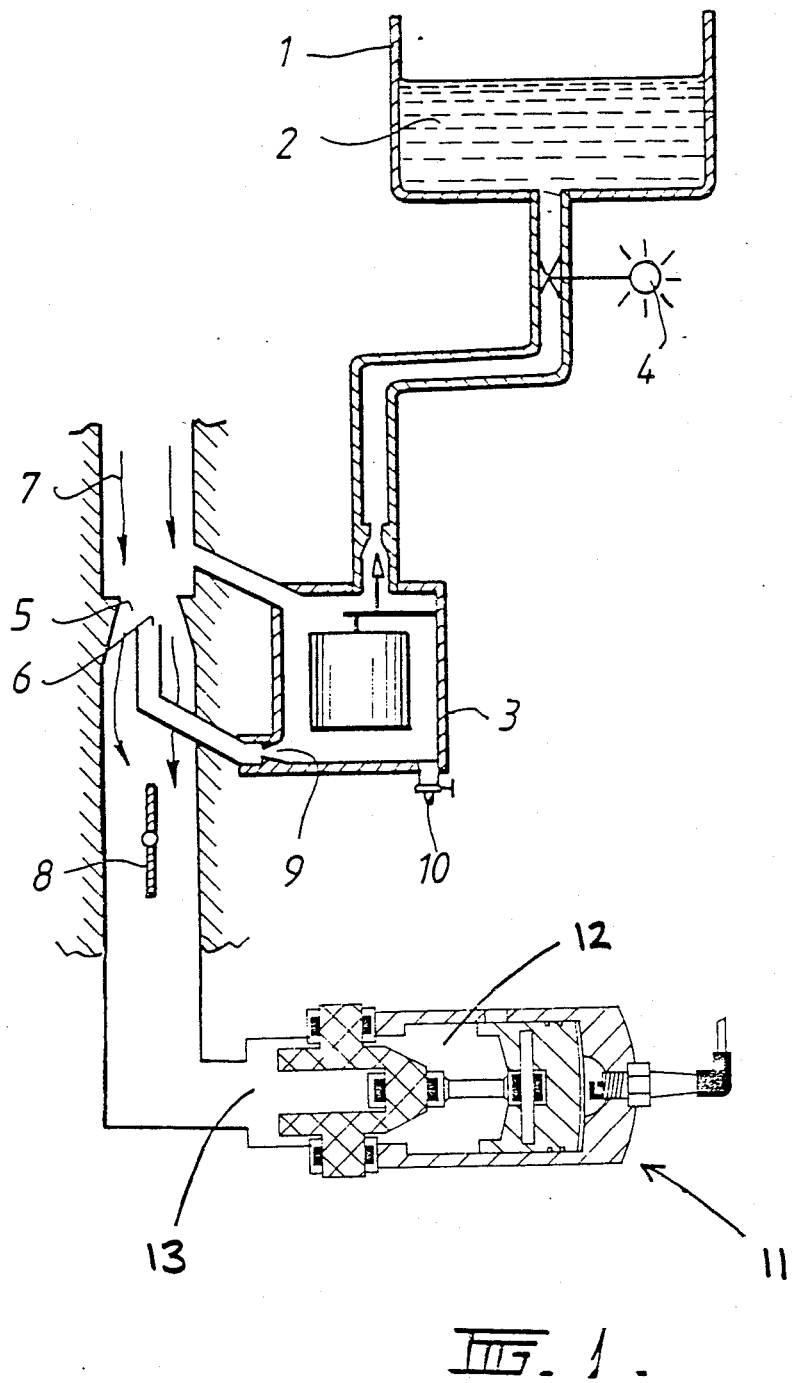
FIG. 1 is a schematic representation of a liquified or compressed fuel gas fuel supply arrangement to a two stroke engine.

Referring to the drawing, a reservoir 1 is shown containing a one to eight solution 2 of two-stroke lubricating oil and liquid petroleum. This solution 2 is shown entering a bowl 3 of a carburettor via a low pressure warning device 4. The low pressure warning device 4 senses a reduction in pressure when the reservoir 1 is empty and closes an electrical circuit actuating an audible alarm. It will be appreciated that as a result of the reservoir being empty other warning or fail safe devices could be adapted to prevent the engine 11 being damaged by lack of lubricating oil. For example, an alarm sensor could be located between the bowl 3 and the atomizing region 5, and the sensor could be adapted to set off the alarm when the solution in the reservoir was below a predetermined minimum level. The solution 2 is drawn past an outlet orifice 6 of the carburettor and atomized by the passage of a mixture of fuel gas and air 7, the fuel gas being the gaseous form of the liquified or compressed petroleum gas. The solution 2 passes to the orifice 6 via a needle valve 9. The needle valve 9 has a bore diameter of 500 $\mu$m with sixteen perpendicularly communicating filter holes, each of 250 $\mu$m bore diameter size. The gas and air are mixed in a known way and this is not illustrated nor is the liquified petroleum gas reservoir which is also of conventional configuration. A mixture of gas, air and atomized solution then passes a throttle valve 8 past crankcase 13 to eventually enter via an entry port the combustion chamber 12 of a two stroke engine 11. The two stroke engine 11 is a conventional two stroke engine 11 except that additional cooling capacity is introduced by addition of a housing on the exhaust manifold such that cooling water is introduced into the housing allowing further cooling of the engine. In use as an outboard engine the cooling is provided by pumping water via rotation of the propellor to the housing on the exhaust manifold. This additional cooling has been found useful as two stroke engines operated on liquified or compressed petroleum gases tend to generate more heat than comparable engines using conventional liquid fuels. In operation it has been found that the engine operates more efficiently than when operated with conventional petroleum. It is also noted that less pollution, particularly in the case of boat use, results. It is possible to transfer an engine operating on the fuel gas to conventional petroleum by draining the bowl 3 at tap 10 after stopping supply of solution 2 in reservoir 1 from flowing to the bowl. Needle valve 9 is replaced with a conventional bore, 200 μm needle valve and a petroleum supply is connected to bowl 3.

Since modifications within the spirit and scope of the invention may be readily effected by persons skilled in the art, it is to be understood that the invention is not limited to the particular embodiment described, by way of example, hereinabove.

What we claim is:

1. A two-stroke internal combustion engine fuelled by liquefied or compressed gas, said engine having a crankcase and including lubricating oil supply means for supplying lubricating oil to the crankcase of said engine, said lubricating oil supply means including dilution means for diluting said lubricating oil with a combustible thinning solvent, atomizing means for atomizing the solution of said lubricating oil and said thinning solvent in a stream of fuel gas and air, and introduction means for introducing the mixture of said atomized solution, air and fuel gas into a combustion chamber of said engine.

2. A two stroke internal combustion engine as defined in claim 1 wherein the combustible thinning solvent is liquid petroleum and the solution contains from 5 to 25% by weight lubricating oil.

3. A two stroke internal combustion engine as defined in claim 1 wherein the engine further comprises a warning means adapted to set off a warning signal when the lubricating oil in a reservoir is below a predetermined lower limit.

4. A two stroke internal combustion engine as defined in claim 1, wherein said engine comprises an outboard motor arrangement.

5. A method of supplying lubricating oil two a stroke engine having a crankcase comprising the steps of forming a solution of lubricating oil and a combustible thinning solvent, atomizing said solution into a stream of fuel gas and air, and introducing the atomized solution, fuel gas and air into a combustion chamber of the engine.

* * * * *